United States Patent
Kohler

[11] 3,900,877
[45] Aug. 19, 1975

[54] ELEVATION MEASURING DEVICE FOR PHASE-INTERFEROMETER AIRCRAFT LANDING SYSTEM

[75] Inventor: Karl Kohler, Heimerdingen, Germany

[73] Assignee: International Standard Electric Corporation, New York, N.Y.

[22] Filed: July 16, 1973

[21] Appl. No.: 379,251

[52] U.S. Cl......... 343/108 M; 343/102; 343/108 R; 343/113 DE
[51] Int. Cl.² ......................................... G01S 1/44
[58] Field of Search .......... 343/108 M, 108 R, 102, 343/113 DE

[56] References Cited
UNITED STATES PATENTS
| | | | |
|---|---|---|---|
| 3,634,862 | 1/1972 | Hiscox et al. | 343/108 R |
| 3,670,338 | 6/1972 | Earp | 343/108 M |
| 3,704,465 | 11/1972 | Masak et al. | 343/102 |

Primary Examiner—Maynard R. Wilbur
Assistant Examiner—Richard E. Berger
Attorney, Agent, or Firm—William T. O'Neill

[57] ABSTRACT

An elevation measuring device for an air navigation system which includes a ground beacon using a commutated array transmitting successively from one radiator element at a time. One element of said array acts as a commutating cycle beginning marker and as a phase and amplitude reference. The airborne receiver imposes a programmed amplitude and phase modulation on successive sets of received pulses to simulate a scanning beam and effects a comparison of measured absolute values from pulse set to pulse set to produce elevation angle information.

The first such set represents a first fraction (first half for example) of the array elements and the second set represents the remaining array elements.

5 Claims, 3 Drawing Figures

ELEVATION MEASURING DEVICE FOR PHASE-INTERFEROMETER AIRCRAFT LANDING SYSTEM

BACKGROUND OF THE INVENTION

1. Field of the Invention

The invention relates generally to the field of electronic aids to air navigation, and more particularly, to elevation determination in a phase interferometer landing guidance system.

2. Description of the Prior Art

There have been various systems developed and used for determining angles of approach for aircraft landing instrumentation.

The so-called ILS (Instrument Landing System) is a device extensively used at commercial airports throughout the world. It allows for air-derived azimuth (course) and elevation (glide slope) determination. In addition, there have been various scanning beam systems used in both air and ground-derived data arrangements. Examples include GCA (Ground Controlled Approach) which derives data on the ground and relies on voice transmission of data to the aircraft; the so-called Doppler (commutated array) ground beacon; and special systems such as the so-called REGAL. Those prior art systems are described in the technical literature and in U.S. Pat. Nos. 2,709,252, 3,626,419 and 3,159,837, respectively.

In addition, a good understanding of the general air navigation aids prior art extant before the time of the most recent developments can be had from the textbook "Electronic Avigation Engineering," by Peter C. Sandretto, published by International Telephone and Telegraph Corp. (1958).

Of more immediate interest in connection with the background of the present invention is U.S. patent application, Ser. No. 326,513, filed Jan. 24, 1973, now U.S. Pat. No. 3,852,749. In that application (by the present inventor and assigned to the present assignee) a ground station and airborne equipment for phase and amplitude measurement are shown. These elements are satisfactory devices for performing those functions in the present invention, and accordingly, that application is incorporated herein by reference.

The well-known prior art techniques, including ILS and elementary Doppler beacon systems, do not afford the type of accuracy which will be required for the landing guidance systems of the future.

SUMMARY OF THE INVENTION

In accordance with the foregoing, it was the general objective of the present invention to provide a system of improved accuracy for airderivation of elevation angle data for aircraft landing approach control.

As aforesaid, the ground station of the above-referenced U.S. patent application, Ser. No. 326,513 is employed in the present device. The same phase and amplitude measuring apparatus is also employed to determine values of those parameters from each received RF pulse (corresponding to excitation of a given radiator of the commutated array in the ground beacon). As the ground array is commutated, the beginning of each cycle of commutation is marked by a reference pulse which makes it possible for the airborne receiver to unambiguously assign each received pulse to a corresponding ground beacon array radiator. The reference pulse also serves as a reference against which each pulse may be amplitude and phase measured.

The received pulses are subjected to a phase and amplitude modification from pulse-to-pulse and the vector sum of these modified pulses is formed.

DESCRIPTION OF THE PREFERRED EMBODIMENTS

As mentioned hereinabove, elevation may be measured by the phase-difference method (phase interferometer). When two radiators are used which are arranged one above the other, the illumination of the ground results in great measuring errors. To avoid these errors, two like radiator groups are employed instead of the two individual antennas; each radiator group produces a highly directional pattern, which will hereinafter be referred to as group pattern.

Figure 1:
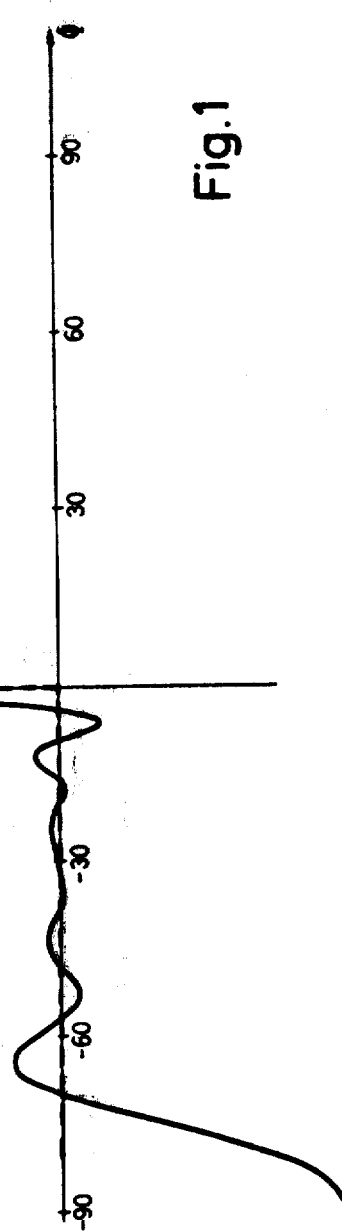
FIG. 1 shows either a first "real" group pattern of a linear antenna array with 20 radiators or the corresponding "virtual" pattern which is used, e.g., to measure elevations greater than 2°.

One of these two like group patterns which would be particularly favorable to the measurement of elevations above 2° is shown as a broken line in FIG. 1 and designated A. With the aid of a linear array consisting of 20 radiators spaced $$d = \frac{\lambda}{2}$$

apart, and if the individual radiators are fed with suitable amplitude and phase, a group pattern according to curve B of FIG. 1 is obtained which comes very close to the ideal pattern A. From the group patterns of two such linear arrays, the elevation could be determined by measuring their phase difference in an airborne station.

After this introduction, the invention may now be described. The invention uses radiator groups whose radiators radiate successively rather than simultaneously. Nevertheless, values are determined in the airborne station which would occur if the radiators radiated simultaneously.

Figure 4:
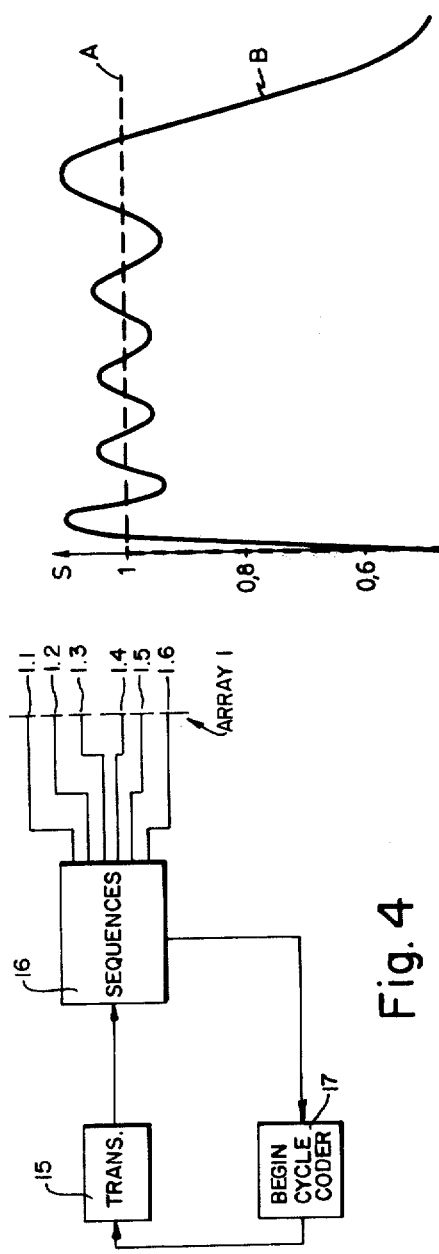

This ground station is that hereinabove incorporated by reference to U.S. Pat. application Ser. No. 326,513 (now U.S. Pat. No. 3,852,749) and is seen in typical form by looking ahead to FIG. 4. In FIG. 4, the radiators 1.1 through 1.6 are sequentially connected (commutated) from a transmitter 15, and each radiator transmits a pulse containing an RF oscillation, the amplitude and phase of which are the same for all radiators. Prior to each radiation cycle, a pulse train is radiated over one radiator (from sequencer 16) arbitrarily 1.1 to identify the beginning of the cycle for the benefit of the airborne receiver. The sequencing of energy from 16 proceeds through radiators 1.1, 1.2, 1.3, 1.4, 1.5 and 1.6 in order. A "begin-cycle" code generator 17 marks the beginning of each commutation cycle by means of a coded pulse group transmission (identification code).

The ground station is located at the end of or beside the runway. It includes a vertical antenna array with 40 like radiators which are lined up parallel to each other. The spacing between the radiators, drawn as dipoles, is equal to one-half the operating wavelength λ. The radiators are successively connected to a transmitter and radiate pulses containing an r.f. oscillation whose amplitude and phase are equal for all radiators. Prior to each radiation cycle, a first pulse train is radiated via the first radiator.

In the receiver, the pulses are processed at the rate at which the radiators of the linear antenna array are connected. When the pulse train appears, it is determined that the pulse from the first radiator follows next, so that an unambiguous assignment of the received pulses to the radiators is obtained. If the pulse received from the first radiator is chosen as the reference pulse, the phases of the pulses received from all radiators can be measured relative to the phase of the reference pulse with the aid of a phase meter provided in the receiver. Likewise, the amplitude of the received pulses can be measured relative to the amplitude of the reference pulse. For ease of explanation, it is assumed that there are no interferences (although this is not true in reality), thence the amplitudes all assume the value of the amplitude of the first pulse. For this explanation, this value is assumed to be 1.

Since each pulse can be unambiguously assigned to one radiator, a number couple consisting of magnitude (amplitude) and phase is thus obtained for each pulse in the receiver. Each number couple represents a complex number Z (a vector). Since the pulse coming from the first radiator is the reference pulse, the associated number couple always has the phase 0 for all receiver positions. The phases of the number couples for the pulses from the other radiators depend on the receiver position.

From the vectors derived from the 40 radiators, two groups are now formed in the receiver; for example, the vectors of the radiators 1 to 20 form one group, and those of the radiators 2 to 40 the other. However, these groups may actually overlap, the grouping given being for example only. The vectors of each group are changed in magnitude and phase, and a sum of the changed vectors is then formed for each group. The change of the vectors in magnitude and phase is effected in the same way as the radiators would have to be fed to obtain the pattern B of FIG. 1. The absolute value of the sum is equal to the field strength which a receiver would determine in a group pattern as shown in FIG. 1, provided 21 the receiver is located at the same elevation. The phase of the vector sum is also equal to the phase of the field strength which a receiver would determine in a group pattern as shown in FIG. 1. Thus, in the airborne station, the magnitude and phase of the same field strength are determined as if a group pattern were present. If a vector sum S were determined for each elevation φ by addition of the vectors, the absolute values of the vector sums for all angles φ, plotted against φ, would yield a curve which will hereinafter be referred to as virtual pattern. The term "virtual" expresses that this pattern is not really present in space, however, it is susbstantially identical to the real group pattern shown in FIG. 1, curve B.

In both groups, the absolute values of the vector sums are equal at equal elevation. However, the vector sums of both groups differ in phase. The phase difference is a measure of the elevation. It can be calculated from the equation $$P_F - P_O = (2\pi)(20)\left(\frac{d}{\lambda}\right)(\sin \phi) \qquad \text{Equation (1)}$$

where $P_O$ is the phase of the sum of the vectors of the pulses derived from the radiators 1 to 20 (group O), and $P_F$ is the phase of the sum of the vectors of the pulses derived from the radiators 21 to 40 (group F). Since the radiation centers of the groups O and F are $20\,d = 10\,\lambda$ apart, the phase difference is inherently ambiguous. That is, for example, a determined value of $P_F - P_O = 30°$ can, in reality, also be $30° + 360°$ or $30° + 720°$, etc.

To make the phase difference unambiguous, two auxiliary values are determined. For determining the first auxiliary value, a third group G is formed from the vectors of the pulses received from the 2nd to 21st radiators. The vector sum of the 20 radiators, changed according to the same law as above, is formed, and its phase $P_G$ is determined. The distance between the radiation center of group G and that of group O is $$d = \frac{\lambda}{2}.$$

The first auxiliary value then follows from the equation $$P_G - P_O = (2\pi)\left(\frac{d}{\lambda}\right)(\sin \phi) \qquad \text{Equation (2)}$$

This equation is unambiguous because, over the entire elevation range, $P_G - P_O$ lies between 0° and 180° (φ between 0° and 90°). If the phase difference is negative, the value is corrected by adding 360°.

For determining the second auxiliary value, a further group Z is formed from the vectors of the pulses received from the 5th to 24th radiators. Again, the sum of these 20 vectors, changed according to the same law as above, is formed, and its phase $P_Z$ is determined. The distance between the radiation center of group Z and that of group O is $4\,d = 2\,\lambda$. The second auxiliary value then follows from the equation $$P_Z - P_O = (2\pi)(4)\left(\frac{d}{\lambda}\right)(\sin \phi) \qquad \text{Equation (3)}$$

The value determined from equation (1) is (by the factor 20) more accurate than the value determined from equation (2). This factor 20 is too great to resolve the ambiguity of the phase measurement $P_F - P_O$ in a single step because the values determined with equations (1) and (2) may be influenced by multipath propagation. This is why the second auxiliary value is necessary.

Thus, the following relationship exists between the phase differences determined with the aid of equations (1) to (3):

$$P_Z - P_O = 4\,(P_G - P_O) \qquad \text{Equation (4)}$$

$$P_F - P_O = 5 (P_Z - P_O) \quad \text{Equation (5)}$$

These two equations are used to determine the unambiguous, accurate elevation value.

After the phase differences $P_G - P_O$ and $P_Z - P_O$ (calculated from the measured vectors), have been substituted into equation (4), the value of $P_Z - P_O$ is increased by 360° so many times until the equation is satisfied in the best possible manner. The value of $P_Z - P_O$ obtained in this way as well as the value of $P_F - P_O$ calculated from the measured vectors are substituted into equation (5). The value of $P_F - P_O$ is then increased by 360° so many times until equation (5) is satisfied in the best possible manner. With the value of $P_F - P_O$ obtained in this way, the elevation $\phi$ is calculated with the aid of equation (1).

Figure 3:
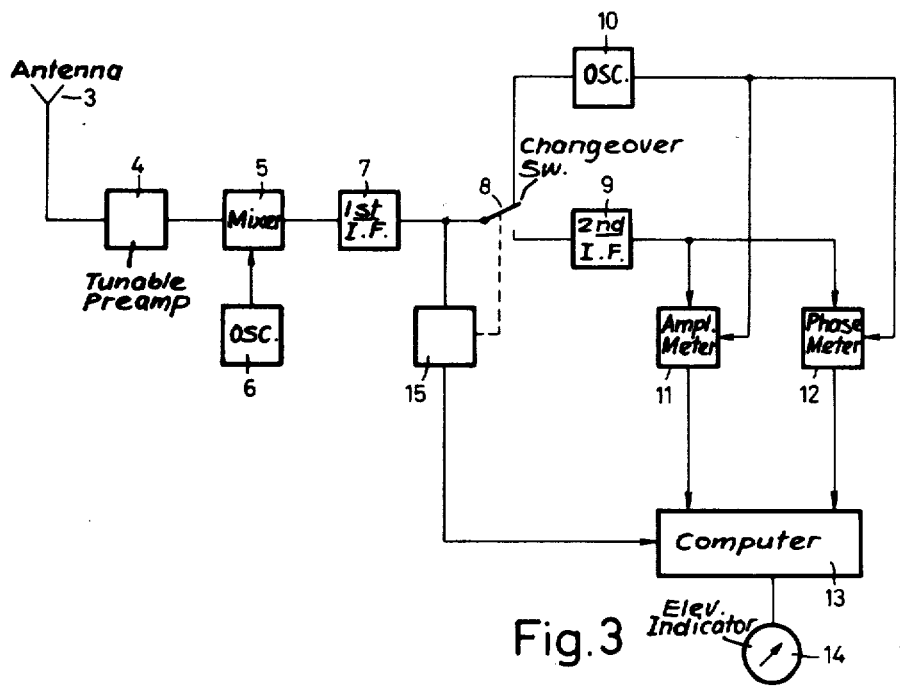
FIG. 3 shows a block diagram of an airborne receiver according to the invention.

Following is a description of the block diagram of the receiver of FIG. 3.

The R.F. pulses are received by an antenna 3; from there, they are applied through a tunable preamplifier 4 to the mixer 5, to whose other input is applied an R.F. oscillation from an oscillator 6. The output of the mixer 5 is connected to a first I.F. unit 7. This unit is followed by a changeover switch 8, which, in the position shown, connects the first I.F. unit 7 to an oscillator 10. If the changeover switch 8 is in the other position, the first I.F. unit 7 is connected to a second I.F. unit 9, to whose output an amplitude meter 11 and a phase meter 12 are connected. The output of oscillator 10 is connected to the second inputs of the amplitude meter 11 and of the phase meter 12. The outputs of the meters 11 and 12 are connected to a computer 13, whose output is connected to an indicator 14 for elevation. Also connected to the output of the first I.F. unit 7 is a device for detecting the pulse train, for actuating the changeover switch 8, and for controlling the computer 13. Thus, the reference phase is established in the receiver. When the device 15 detects the pulse train, it sends a signal to the computer 13 and puts the changeover switch into the position shown, so that the subsequent pulse from the first radiator is applied to the highly accurate (coherent) oscillator 10 and synchronizes the latter with respect to amplitude and phase.

After the first pulse, the changeover switch 8 is changed to the alternate position so that the succeeding pulses are applied through the second I.F. unit 9 to the meters 11 and 12. The phase and the amplitude of the output signal of oscillator 10 are the measured quantities of the first pulse and serve as reference quantities for the measurement of the phases and amplitudes of the pulses from the second to ($n$)th radiators. The amplitude and phase meters are known per se and, therefore, will not be explained here in detail.

The phase value $\phi_\nu$ and the amplitude value $A_\nu$ ($\nu = 1 \ldots n$) are stored in the memory of the computer or in a separate memory.

The read-in is controlled by a counter which is advanced at the same rate as that of the connection of the radiators of the linear array and, when the pulse train (reference) appears, is restored to its initial position.

The amplitude values $A_\nu$ and the phase values $\phi_\nu$ determine the vectors $Z_\nu$ according to the equation $$Z_\nu = (A_\nu) \exp(i \phi_\nu) \quad \text{Equation (6)}$$

where $i^2 = -1$. These vectors are stored in a buffer storage.

The vectors are now modified in groups and added into vector sums according to the following equations:

$$V_O = \sum_{\nu=1}^{10} \frac{1}{2\nu-1} \left( Z_{10+\nu} \exp(-i\alpha_\nu) + Z_{11-\nu} \exp(i\alpha_\nu) \right) = A_O \exp(iP_O)$$

$$V_G = \sum_{\nu=1}^{10} \frac{1}{2\nu-1} \left( Z_{11+\nu} \exp(-i\alpha_\nu) + Z_{12-\nu} \exp(i\alpha_\nu) \right) = A_G \exp(iP_G)$$

$$V_Z = \sum_{\nu=1}^{10} \frac{1}{2\nu-1} \left( Z_{14+\nu} \exp(-i\alpha_\nu) + Z_{15-\nu} \exp(i\alpha_\nu) \right) = A_Z \exp(iP_Z)$$

$$V_F = \sum_{\nu=1}^{10} \frac{1}{2\nu-1} \left( Z_{30+\nu} \exp(i\alpha_\nu) + Z_{31-\nu} \exp(i\alpha_\nu) \right) = A_F \exp(iP_F)$$

Equation (7)

where A is the amplitude, and P the phase, of the respective vector sum V.

For even-numbered values of $\nu$, $\alpha_\nu = 135°$; for odd-numbered values of $\nu$, $\alpha_\nu = 45°$.

From the group phases $P_O$, $P_G$, $P_Z$, and $P_F$, the phase differences are now determined with the aid of equations (4) and (5) as described above, and the elevation $\phi$ is calculated according to equation (1).

The absolute values of all four vector sums are equal, i.e.

$$S = |V_O| = |V_G| = |V_Z| = |V_F|$$

If the absolute values of all receiver positions are plotted, the virtual pattern B of FIG. 1 is obtained. This curve very closely approximates to the ideal curve A. In the range between $\phi = -8°$ and $\phi = -60°$, the influences of the ground are nearly completely eliminated through the good approximation to $S = 0$. An exact computation of errors shows that the measuring error caused by the ground is smaller than $\pm 0.1°$ for $2.5° \leq \phi \leq 60°$ at any height of the array above ground. For that analysis, the ground is assumed to be plane, horizontal, and homogeneous, with $\epsilon\nu = 15$. Vertical polarization is assumed.

Figure 2:
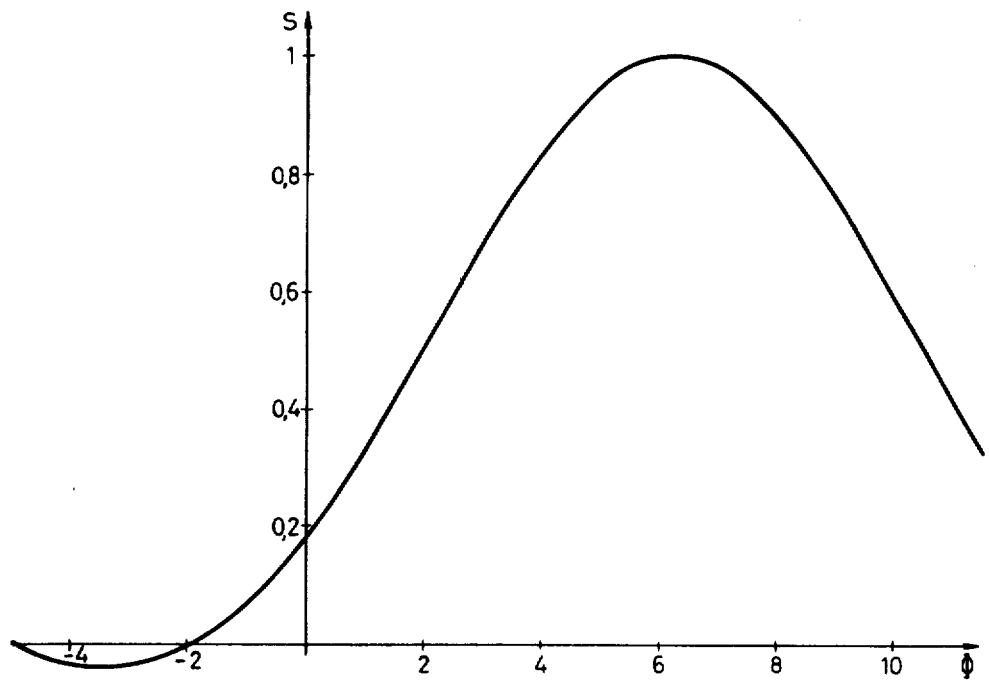
FIG. 2 shows either a second "real" group pattern of a linear antenna array with 20 radiators or the corresponding "virtual" pattern which is used, e.g., to measure elevations equal to or smaller than 6°.

If it is desirable to have equal or greater accuracy in the range below 2.5°, a pattern as shown in FIG. 2 is used. It is a one-lobe pattern whose direction of maximum radiation forms an elevation angle of 6° with the horizon. This pattern would be obtained as a group pattern if, of the 40 radiators of the ground station, 20 radiators arranged side by side radiated simultaneously, the first radiator being fed with a phase $\alpha = -19°$, and the succeeding radiators each with a multiple of the angle $\alpha$ ($2\alpha$, $3\alpha$...$20\alpha$), corresponding to their ordinal numbers (within the group) and with suitable amplitudes.

Since the radiators of the ground station do not radiate simultaneously, no group pattern is present, and the field strength of the group pattern which corresponds to the location of the aircraft is again simulated in the receiver.

The calculation operation is similar to that for the above-described determination of the elevation. First, the following vector sums are determined:

$$V_o = \sum_{\nu=1}^{20} \left(1 - 0.5 \cos\left(\nu - \frac{1}{2}\right)\frac{4\pi}{n}\right) Z_\nu \exp(i\nu\alpha) = A_o' \exp(iP'_o)$$

$$V_G = \sum_{\nu=1}^{20} \left(1 - 0.5 \cos\left(\nu - \frac{1}{2}\right)\frac{4\pi}{n}\right) Z_{\nu,1} \exp(i\nu\alpha) = A_G' \exp(iP'_G)$$

$$V_Z = \sum_{\nu=1}^{20} \left(1 - 0.5 \cos\left(\nu - \frac{1}{2}\right)\frac{4\pi}{n}\right) Z_{\nu,+4} \exp(i\nu\alpha) = A_Z' \exp(iP'_Z)$$

$$V_F = \sum_{\nu=1}^{20} \left(1 - 0.5 \cos\left(\nu - \frac{1}{2}\right)\frac{4\pi}{n}\right) Z_{\nu,+20} \exp(i\nu\alpha) = A_F' \exp(iP'_F)$$

Equation (8)

The absolute values $A_o'$, $A_G'$, $A_Z'$, and $A_F'$ of the vector sums are equal and, calculated for all receiver positions, yield the virtual pattern of FIG. 2.

From the phases $P_o'$, $P_G'$, $P_Z'$ and $P_F'$, the elevation is again determined, as described above, with the aid of equations (4), (5) and (1).

At heights of the linear antenna array above ground between $\lambda$ and $20\lambda$ and at elevations from 1.6°, this method has a system error of $\pm 0.05°$.

The airborne receiver is advantageously designed to switch from one of the aforementioned modes of operation to another at a point of angle around 6° elevation.

What is claimed is:

1. In an air navigation system, a device for air-derivation of elevation angle of an airborne receiver, with respect to a ground beacon array transmitting R.F. pulses of equal magnitude and phase cyclically and successively from a commutated linear array of N equally spaced radiator elements, said system further including a reference pulse for identifying the beginning of a cycle of commutation at said ground beacon and for providing a phase and amplitude standard in said receiver, the combination comprising:

means within said receiver for measuring the phase and amplitude of the pulses corresponding to a first sub-group of successive ones of said radiator elements and of a second sub-group of said radiator elements to provide a corresponding pair of sets of phase and amplitude values;

means within said receiver for modifying the phase and amplitude of received energy of each pulse in each of said groups to simulate a directive beam scanning pattern of received energy;

means for determining the vector sum of said pulses within each of said sets on a pulse-to-pulse basis; and means for deriving the phase difference of the two vector sums corresponding to said sub-groups, said phase difference representing a measure of elevation angle.

2. Apparatus according to claim 1 in which said first and second sub-groups of said radiators each comprise N/2 radiator elements symmetrically on either side of the center of said array.

3. Apparatus according to claim 1 in which said modification of measured received pulse phase and amplitude is such that the absolute value of said vector sum is representative of the field strength which would occur at the location of said receiver if a group pattern having a field strength approximately equal for all elevation angles were present.

4. Apparatus according to claim 1 in which said modification of measured received pulse phase and amplitude is such that the absolute value of said vector sum is equal to the field strength which would occur at the place of the receiver if a group pattern with a main lobe raised in elevation were present.

5. Apparatus according to claim 1 in which two additional pulse groups are formed representative of third and fourth radiator element sub-groups containing fewer elements than said first and second subgroups and having radiation centers relatively near the radiation center of said first sub-group; and computing means are included for identifying unambiguous phase measurement derived from comparisons between said first, second and third element sub-group pulse groups to provide unambiguous phase measurement, said measurement between said first and second pulse groups providing a measurement of more accuracy as a refinement of the approximate phase as determined by said computing means.

* * * * *